United States Patent
Marcus et al.

(10) Patent No.: US 9,858,304 B2
(45) Date of Patent: Jan. 2, 2018

(54) COMPUTING CROSS-CORRELATIONS FOR SPARSE DATA

(71) Applicant: RAYTHEON COMPANY, Waltham, MA (US)

(72) Inventors: Eran Marcus, Culver City, CA (US); David U. Fluckiger, Allen, TX (US); Brian F Boland, Redondo Beach, CA (US)

(73) Assignee: RAYTHEON COMPANY, Waltham, MA (US)

( * ) Notice: Subject to any disclaimer, the term of this patent is extended or adjusted under 35 U.S.C. 154(b) by 413 days.

(21) Appl. No.: 14/671,614

(22) Filed: Mar. 27, 2015

(65) Prior Publication Data

US 2016/0350346 A1    Dec. 1, 2016

Related U.S. Application Data

(60) Provisional application No. 61/979,990, filed on Apr. 15, 2014.

(51) Int. Cl.
  *G06F 17/30*  (2006.01)
  *G06F 17/15*  (2006.01)
  (Continued)

(52) U.S. Cl.
  CPC ........ *G06F 17/30336* (2013.01); *G01S 7/486* (2013.01); *G01S 17/10* (2013.01);
  (Continued)

(58) Field of Classification Search
  CPC ........... G06F 17/3053; G06F 17/30336; G06F 17/142; G06F 17/15; G01S 7/486; G01S 717/10; G01S 17/10
  (Continued)

(56) References Cited

U.S. PATENT DOCUMENTS

| | | | |
|---|---|---|---|
| 5,864,313 A * | 1/1999 | Speck | G01S 7/288 342/101 |
| 2005/0143971 A1* | 6/2005 | Burstein | G06F 17/274 704/4 |

(Continued)

OTHER PUBLICATIONS

Amir, et al. "Deterministic Length Reduction: Fast Convolution In Sparse Data and Applications" Combinatorial Pattern Matching; [Lecture Notes In Computer Science] Jul. 9, 2007 (pp. 183-194).

(Continued)

*Primary Examiner* — Thanh-Ha Dang
(74) *Attorney, Agent, or Firm* — Lewis Roca Rothgerber Christie LLP

(57) ABSTRACT

A method for computing a cross-correlation between a first sequence and a second sequence includes: generating a first index vector based on the first sequence, the first index vector including a plurality of first elements, the first index vector excluding indices of zero valued elements of the first sequence; generating a second index vector based on the second sequence, the second index vector including a plurality of second elements, the second index vector excluding indices of zero valued elements of the second sequence; computing, on a processor, a plurality of pairwise differences between each of first elements of the first index vector and each of the second elements of the second index vector; and binning, on the processor, the plurality of pairwise differences to generate the cross-correlation of the first sequence and the second sequence.

16 Claims, 4 Drawing Sheets

(51) Int. Cl.
    *G01S 17/10*    (2006.01)
    *G01S 7/486*    (2006.01)
    *G06F 17/14*    (2006.01)
(52) U.S. Cl.
    CPC ............ *G06F 17/142* (2013.01); *G06F 17/15* (2013.01); *G06F 17/3053* (2013.01)
(58) Field of Classification Search
    USPC ......................................................... 707/744
    See application file for complete search history.

(56) References Cited

U.S. PATENT DOCUMENTS

| | | | | |
|---|---|---|---|---|
| 2006/0277041 | A1* | 12/2006 | Stuns ...................... | G06F 17/15 704/222 |
| 2011/0052600 | A1* | 3/2011 | Budelsky ............. | C07K 16/244 424/158.1 |
| 2012/0143038 | A1* | 6/2012 | Georgopoulos ... | A61B 5/04008 600/409 |
| 2012/0330636 | A1* | 12/2012 | Albou ................ | G06K 9/00201 703/12 |
| 2013/0129216 | A1* | 5/2013 | Tsai ....................... | G06K 9/325 382/170 |
| 2016/0210332 | A1* | 7/2016 | Milton .............. | G06F 17/30551 |

OTHER PUBLICATIONS

Muthukrishnan "New Results and Open Problems Related To Non-Standard Stringology", Combinatorial Pattern Matching, Springer Berlin Heidelberg, Jul. 5, 1995 (pp. 298-317).
Written Opinion of the International Searching Authority for International Application No. PCT/US2012/026048 filed Apr. 15, 2015, Written Opinion of the International Searching Authority dated Aug. 31, 2015 2015 (7 pgs.).
International Search Report for International Application No. PCT/US2012/026048, filed Apr. 15, 2015, International Search Report dated Aug. 24, 2015 and mailed Aug. 31, 2015 (4 pgs.).

* cited by examiner

COMPUTING CROSS-CORRELATIONS FOR SPARSE DATA

CROSS-REFERENCE TO RELATED APPLICATION

This application claims the benefit of U.S. Provisional Patent Application No. 61/979,990, titled "Computing Cross-Correlations for Sparse Data," filed in the United States Patent and Trademark Office on Apr. 15, 2014, the entire disclosure of which are incorporated herein by reference.

GOVERNMENT LICENSE RIGHTS

This invention was made with Government support. The Government has certain rights in this invention.

BACKGROUND

Cross-correlation is a mathematical technique for measuring the similarity of two functions and is commonly used for searching a long signal to identify a shorter, known feature, such as when performing pattern recognition in radar signal analysis, neurophysiology, cryptanalysis, and economics. A cross-correlation is also referred to as a "sliding dot product" or "sliding inner product."

Generally, a fast Fourier transform (FFT) and a pointwise product operation can be used to compute a cross-correlation of two discrete signals. The FFT takes as input two full vectors. For example, when computing the cross-correlation of signals a and b having length $N_a$ and $N_b$, respectively, these sequences can be respectively represented as full vectors of N elements: $\{a_1, a_2, \ldots, a_{Na}\}$ and $\{b_1, b_2, \ldots, b_{Nb}\}$. The fastest known algorithms for performing FFT-based cross-correlation have a computational complexity on the order of $N \log_2 N$.

In some applications, most of the elements in the sequence (e.g., $\{a_1, a_2, \ldots, a_{Na}\}$) are zero. Such signals are often referred to as being "sparse" and a sequence of length N having n non-zero elements can be referred to as having a "sparsity" of $(N-n)/N$, where the sparsity refers to the fraction of elements in the sequence that are zero.

For example, when operating a Geiger-mode laser radar, relatively long periods of time may elapse between detection events registered by the detector. As such, the output of such a detector will often contain long runs of zeroes and the sparsity of the data is often greater than 0.999.

Storing all of the elements (the "full vector") in a sparse sequence can be space inefficient because of the number of duplicate elements (e.g., zero valued elements). In addition, because the FFT-based cross-correlation computation operates on the entire vector of N elements, there is a significant amount of wasted computational work in performing operations that result in a value of zero for most of the correlation coefficients.

Various alternative types of data structures are often used to represent sparse data using less space or memory. For example, a coordinate list data structure reduces space requirements by storing only the non-zero elements and the positions of those elements in the sequence.

SUMMARY

Embodiments of the present invention are directed to systems and methods for computing cross-correlations of sparse data.

According to one embodiment of the present invention, a method for computing a cross-correlation between a first sequence and a second sequence includes: generating a first index vector based on the first sequence, the first index vector including a plurality of first elements, the first index vector excluding indices of zero valued elements of the first sequence; generating a second index vector based on the second sequence, the second index vector including a plurality of second elements, the second index vector excluding indices of zero valued elements of the second sequence; computing, on a processor, a plurality of pairwise differences between each of the first elements of the first index vector and each of the second elements of the second index vector; and binning, on the processor, the plurality of pairwise differences to generate the cross-correlation of the first sequence and the second sequence.

The method may further include identifying a largest valued bin from among a plurality of bins produced by binning the plurality of pairwise differences.

The first sequence and the second sequence may be binary valued.

The first sequence and the second sequence may be real valued or complex valued.

The first sequence may include a plurality of first weights and the second sequence may include a plurality of second weights.

The binning of the pairwise differences into a plurality of bins to generate the cross-correlation of the first sequence and the second sequence may include, for each bin: multiplying the weights of the elements of each pair of elements of the bin to generate a plurality of products; and summing the plurality of products of the bin.

All of the elements of the first index vector may be non-zero, and all of the elements of the second index vector may be non-zero.

The method may further include converting elements of the first sequence below a threshold level to a value of zero before generating the first index vector based on the first sequence.

According to one embodiment of the present invention, a system for computing a cross-correlation between a first sequence and a second sequence includes: a memory configured to store the first sequence and the second sequence; and a processor configured to: generate a first index vector based on the first sequence, the first index vector including a plurality of first elements, the first index vector excluding indices of the zero valued elements of the first sequence; generate a second index vector based on the second sequence, the second index vector including a plurality of second elements, the second index vector excluding indices of the zero valued elements of the second sequence; compute a plurality of pairwise differences between each of the first elements of the first index vector and each of the second elements of the second index vector; and bin the plurality of pairwise differences to generate the cross-correlation of the first sequence and the second sequence.

The processor may be further configured to identify a largest valued bin from among a plurality of bins of pairwise differences.

The first sequence and the second sequence may be binary valued.

The first sequence and the second sequence may be real valued or complex valued.

The first sequence may include a plurality of first weights and wherein the second sequence may include a plurality of second weights.

The processor may be further configured to bin the plurality of differences into a plurality of bins to generate the cross-correlation of the first sequence and the second sequence by, for each bin: multiplying the weights of the elements of each pair of elements of the bin to generate a plurality of products; and summing the plurality of products of the bin.

All of the elements of the first index vector may be non-zero, and all of the elements of the second index vector may be non-zero.

The processor may be further configured to convert elements of the first sequence below a threshold level to a value of zero before generating the first index vector based on the first sequence.

BRIEF DESCRIPTION OF THE DRAWINGS

The accompanying drawings, together with the specification, illustrate exemplary embodiments of the present invention, and, together with the description, serve to explain the principles of the present invention.

DETAILED DESCRIPTION

Figure 1:
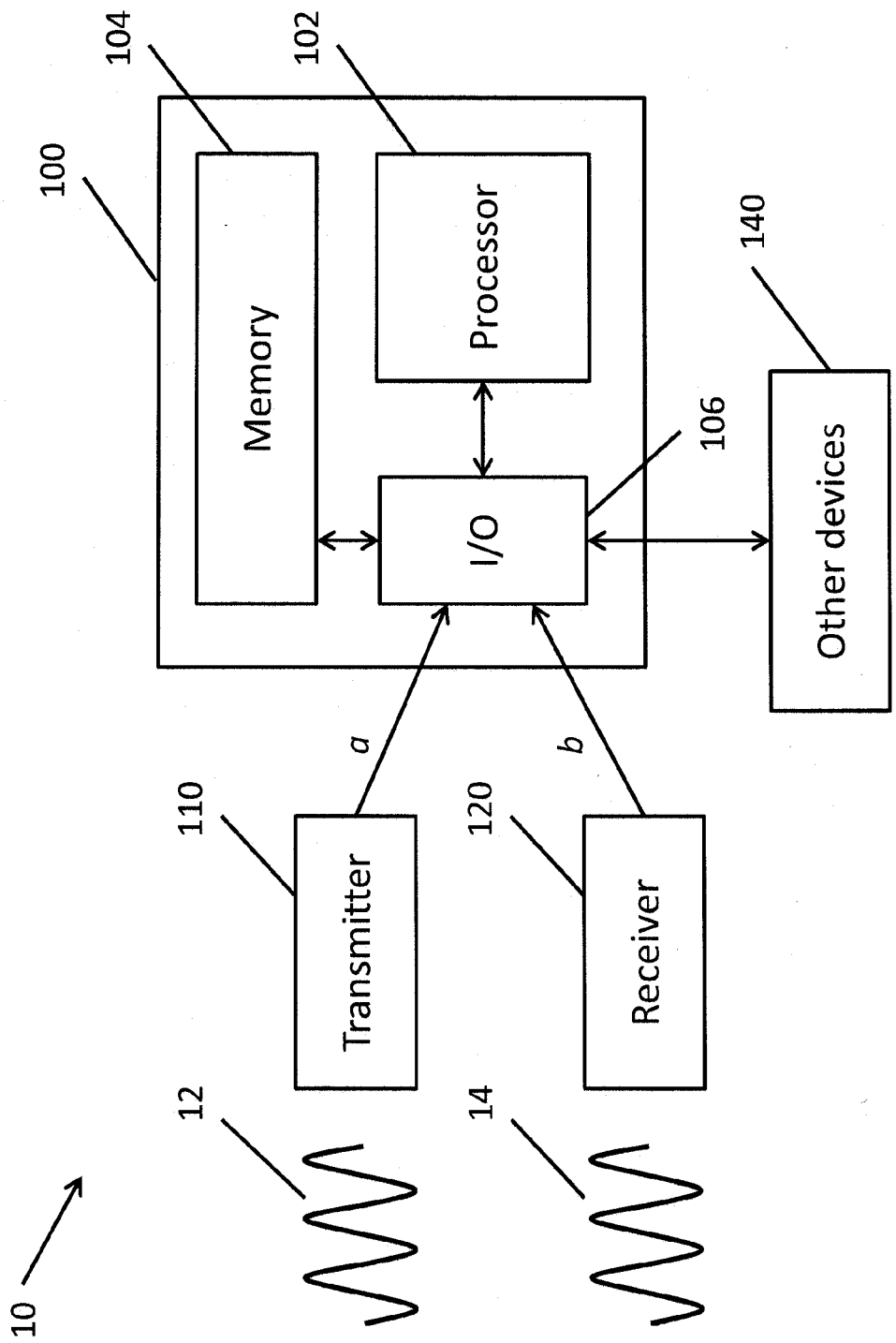
FIG. 1 is a schematic block diagram of a system configured to transmit signals, receive signals, and process the transmitted and received signals according to one embodiment of the present invention.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Embodiments of the present invention are directed to systems and methods for computing cross-correlations of sparse data. In some embodiments of the present invention, the algorithm computes the cross-correlation (or, in some embodiments, approximates the cross-correlation), and consumes fewer computational resources (e.g., processor cycles and memory) than the FFT-based technique if the input sequences have sufficient sparsity.

FIG. 1 is a schematic block diagram of a system 10 configured to transmit signals, to receive signals, and to process the transmitted and received signals. For example, in one embodiment, such a system 10 is a laser radar device or a light detection and ranging system (LIDAR) configured to transmit laser pulses, receive reflected laser pulses, and compare the transmitted signal with the received signal to compute range information.

Referring to FIG. 1, a system 10 includes a signal processor 100 coupled to a transmitter 110, a receiver 120, and other devices 140 such as an end-user device, a general purpose processor, a display device, a communication device, etc. The transmitter 110 is configured to transmit a waveform or other first signal 12 and the receiver 120 is configured to receive a second signal 14.

Signal sequences a and b respectively representing the first signal 12 and the second signal 14 are supplied to the signal processor 100. The signal processor 100 includes a processor 102, a memory 104, and input/output 106. The signal processor 100 receives signal sequences a and b through input/output 106 and stores sequences a and b in memory 104. The processor 102 is configured to process the sequences a and b and to generate an output to be supplied to other devices 140 through the input/output 106.

For example, in a laser radar range finder, the transmitter 110 includes a laser configured to transmit pulses of light as the first signal 12 and the receiver 120 includes a photodiode configured to detect light as the second signal 14. The signal processor 100 is configured to analyze the first (or transmitted) sequence a and the second (or received) sequence b to identify reflections of the first signal 12 in the second signal 14 by computing the cross-correlation of sequences a and b. The signal processor 100 calculates the time elapsed between transmission of the first signal and the identified reflections in the second signal using the cross-correlation and computes a distance to a target using the calculated time and the speed of light.

Figure 2A:
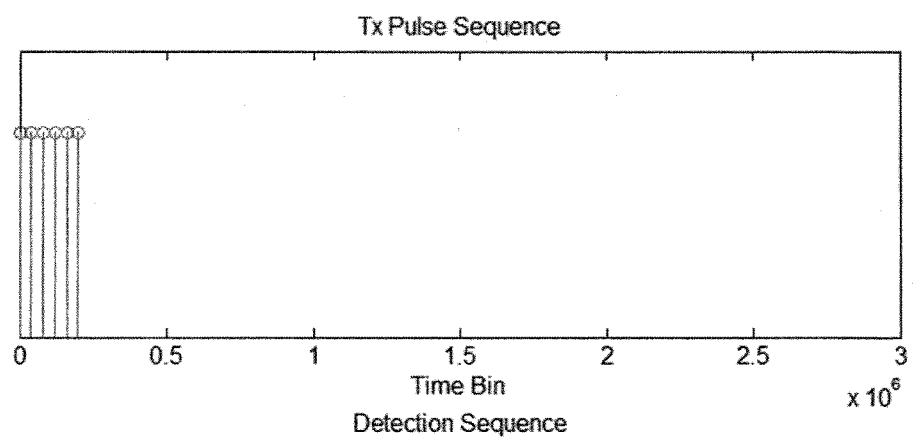
FIG. 2A is a graph illustrating a first series of pulses.
Figure 2B:
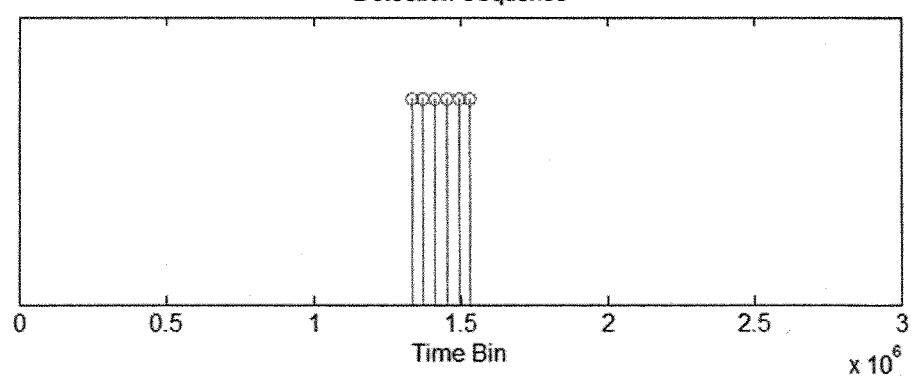
FIG. 2B is a graph illustrating a second series of pulses.
Figure 2C:
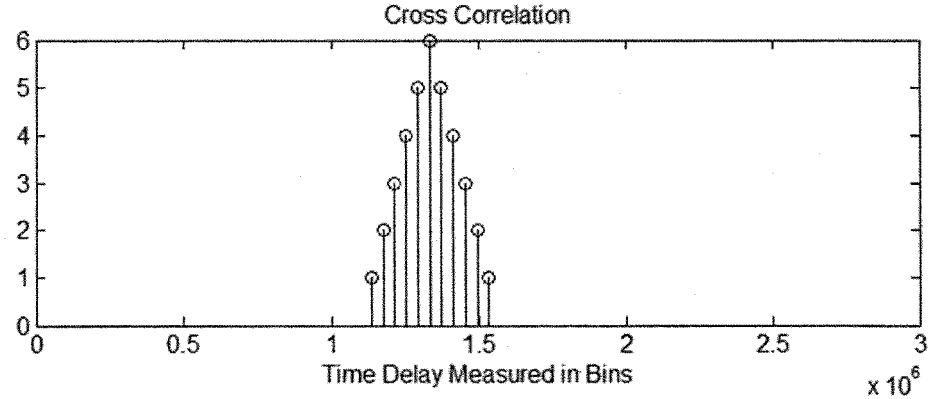
FIG. 2C is a graph illustrating a cross-correlation of the first series of pulses and the second series of pulses.

As an example of a range finding process, FIGS. 2A, 2B, and 2C respectively illustrate: a first series of transmitted pulses of the first signal 12; a second series of received pulses of the second signal 14; and a cross-correlation of the first series of pulses and the second series of pulses.

The horizontal axes of FIGS. 2A, 2B, and 2C are time bin indices, the vertical axes of FIGS. 2A and 2B depict the amplitude of a signal within a time bin, the vertical axis of FIG. 2C is the value of the cross correlation of binary valued signals 12 and 14 as a function of time delay measured in units of a time bin. The width of a time bin in FIGS. 2A, 2B, and 2C is 1.25 ns.

As seen in FIG. 2A, a series of six pulses corresponding to a first sequence is transmitted during time bins 0, 40000, 80000, 120000, 160000, and 200000. A corresponding series of six pulses is received during time bins 1333336, 1373336, 1413336, 1453336, 1493336, and 1533336, as shown in FIG. 2B. Computing a unit bin width histogram of the difference table formed from the first signal (shown in FIG. 2A) and the second signal (shown in FIG. 2B) produces the cross correlation shown in FIG. 2C. The peak of the histogram in FIG. 2C is at 1333336, which corresponds to the time delay between the pulses of the first series in FIG. 2A and the pulses in the second series in FIG. 2B.

As described in the background above, performing a cross-correlation operation using the FFT and pointwise multiplication involves using the full vector of data (e.g., using all N values), thereby requiring the processor to perform calculations that result in zero valued correlation coefficients. In the example shown in FIGS. 2A, 2B, and 2C, using the FFT based method would require, for example, considering all the zero valued data points of FIG. 2B in time bins between 0 and 1333336 and between 1533336 and 3000000, which do not contribute to the nonzero valued cross-correlation coefficients shown in FIG. 2C.

Embodiments of the present invention are directed to systems and methods for computing the cross-correlation of two binary sequences using the unit-bin histogram of the difference table of the non-zero index lists of the two binary sequences.

Generally, the l-th term of an output cross-correlation sequence c of input sequences a and b is given as:

$$c_l = \sum_m a_m b_{m+l} \quad (1)$$

To simplify this analysis, first consider the case in which a and b are sparse binary:

$$a_n = \sum_{i=1}^{n_a} \delta_{A_i,n} \quad a_n = \sum_{i=1}^{n_a} \delta_{A_i,n} \quad b_n = \sum_{i=1}^{n_b} \delta_{B_i,n} \quad (2)$$

where $\{A_i\}_{i=1}^{n_a}$ and $\{B_i\}_{i=1}^{n_b}$ are the locations of the nonzero entries in sequences a and b, respectively, and $\delta_{n,m}$ is the Kronecker delta:

$$\delta_{n,m} = \begin{cases} 1 & \text{if } n = m \\ 0 & \text{if } n \neq m \end{cases}$$

Substituting the above representations of $a_n$ and $b_n$ of (2) into (1), we can rearrange $c_l$ as follows:

$$c_l = \sum_m \sum_{i=1}^{n_a} \delta_{A_i,m} \sum_{j=1}^{n_b} \delta_{B_j,m+l} = \quad (3)$$

$$\sum_i \sum_j \sum_m \delta_{A_i,m} \delta_{B_j,m+l} = \sum_i \sum_j \sum_m \delta_{A_i,m} \delta_{B_j-l,m} =$$

$$\sum_{i,j} \delta_{A_i,B_j-l} = \sum_{i,j} \delta_{l,B_j-A_i} = \sum_{\{i,j|B_j-A_i=l\}} 1$$

As seen above, the l-th term $c_l$ of cross-correlation sequence c can be interpreted as the number (or count) of pairs of non-zero entries $A_i$ and $B_j$ respectively of sequences a and b that are separated by l in the sequence (e.g., $B_j - A_i = l$).

Drawing from this analysis, a "difference table" d of "pairwise differences" of $B_j$ and $A_i$ of the sequences a and b (where the i, j-th entry of d is set: $d_{ij} = B_j - A_i$). The unit-bin histogram $h_l$ of $d_{ij}$ is defined by the number of locations of d where $d_{ij} = l$ ($h_l = \#\{i,j | d_{ij} = l\}$), which is equal or equivalent to the last expression in (3) above for $c_l$. Therefore, $h_l = c_l$. In other words, the unit bin histogram $h_l$ of difference table $d_{ij}$ of sequences a and b is the same as the cross-correlation c of sequences a and b.

To consider the general case, one can relax the above assumption that a and b are sparse binary by multiplying each of the terms of the sequences a and b by corresponding weights $\alpha$ and $\beta$:

$$a_n = \sum_{i=1}^{n_a} \alpha_i \delta_{A_i,n} \quad b_n = \sum_{i=1}^{n_b} \beta_i \delta_{B_i,n} \quad (4)$$

where $\{A_i\}_{i=1}^{n_a}$ and $\{B_i\}_{i=1}^{n_b}$ are again the locations of the nonzero entries in a and b. Weights $\alpha$ and $\beta$ can be real numbers or complex numbers, so long as the cross-correlation includes a complex conjugate of one sequence.

Substituting the new formulations of $a_n$ and $b_n$ from (4) into (1) and rearranging yields:

$$c_l = \sum_m \sum_{i=1}^{n_a} \alpha_i \delta_{A_i,m} \sum_{j=1}^{n_b} \beta_j \delta_{B_j,m+l} = \quad (5)$$

$$\sum_{i,j} \alpha_i \beta_j \sum_m \delta_{A_i,m} \delta_{B_j-l,m} = \sum_{\{i,j|B_j-A_i=l\}} \alpha_i \beta_j$$

Therefore, in the general case, cross-correlation $c_l$ at offset l is equal to the sum of the pairwise products $\alpha_i \beta_j$ of all pairs whose locations ($A_i$ and $B_j$) differ by l.

Figure 3:
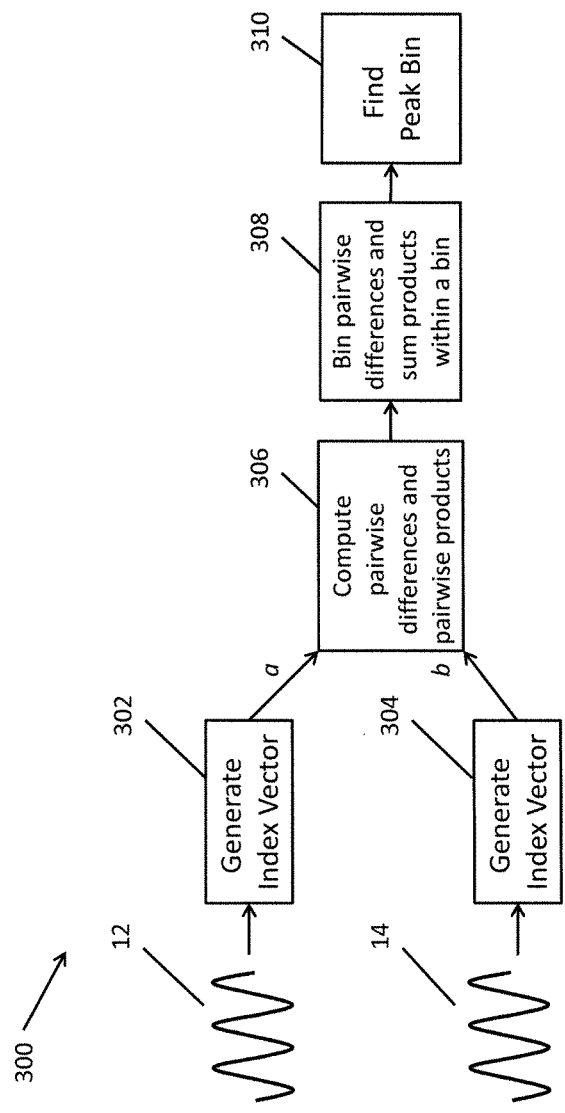
FIG. 3 is a flowchart illustrating a method for computing a cross-correlation of two signals according to one embodiment of the present invention.

FIG. 3 is a flowchart illustrating a method 300 for computing the cross-correlation of two signals according to one embodiment of the present invention. According to embodiments of the present invention, and, unlike in the FFT-based approach, the sparse input data is not treated as full. As such, in some embodiments of the present invention, only the non-zero values of the input sequences are used in the computation and only non-zero values of the output sequence are computed. In other embodiments of the present invention some of the zero values are retained in the input sequences a and b during the computation.

Referring to FIG. 3, first signal 12 and second signal 14 are received and sparse index vectors are generated for the corresponding first sequence a having $N_a$ entries and $n_a$ non-zero entries and second sequence b having $N_b$ entries and $n_b$ non-zero entries in operations 302 and 304. The sparse index vectors may be structured, for example, as a list of pairs, where the pairs refer to a location (or index) in the sequence and the value of the sequence at that location. In some embodiments of the present invention, zero values in the first sequence a and second sequence b are not stored in the sparse index vectors such that only non-zero data appears in the sparse index vectors. In other embodiments, some of the zero values in the first sequence a and second sequence b remain in the sparse index vectors. As such, the sparse index vectors representing a and b each respectively contain only $n_a$ and $n_b$ entries, where, when a and b are sparse, $n_a \ll N_a$ and $n_b \ll N_b$. The sparse index vectors can be stored in memory 104 of the signal processor 100.

The signal processor 100 (e.g., the processor 102 of the signal processor 100) computes pairwise differences and pairwise products of the indexes of each of the values of the generated sparse index vectors representing signals a and b in operation 306. For example, in one embodiment, for each value $B_j$ in b (where $\{B_i\}_{i=1}^{n_b}$ gives the locations of the non-zero entries in b), $n_a$ difference pairs $d_{ij}$ are computed by subtracting $A_i$ (where $\{A_i\}_{i=1}^{n_a}$ gives the locations of the non-zero entries in a) from $B_j$ to generate a total of $n_a n_b$ difference pairs. In other words, the values at positions i,j in difference table d are: $d_{ij} = B_j - A_i$.

According to one embodiment of the present invention, these pairwise differences are computed using nested loops by iterating through values of $B_j$ in an outer loop and iterating through values of $A_i$ in an inner loop. According to another embodiment of the present invention, these pairwise differences are computed by generating a first $n_b \times n_a$ array by repeating sequence b along each of the $n_a$ columns, generating a second $n_b \times n_a$ array by repeating sequence a along each of the $n_b$ rows, and computing the difference between corresponding positions in the first and second arrays. As such, the computational complexity of this operation is on the order of $n_a n_b$ and is independent of N.

After computing the $n_a n_b$ difference pairs in operation 306, the signal processor 100 bins the difference pairs and sums their products in operation 308. In other words, difference pairs $B_j-A_i$ that have the same value or that fall within the same range (or "bin") are collected together. The values of the sequences a and b at positions $A_i$ and $B_j$ are multiplied (e.g., $\alpha_i \beta_j$) and the resulting products are summed. The resulting values represent the cross-correlation of sequences a and b.

The signal processor also identifies a largest of the bins in operation 310 when computing, for example, the time delay between first and second signals.

Embodiments of the present invention can be implemented in a variety of ways such as a general purpose processor (e.g., a processor based on an ARM® architecture or an Intel® or AMD® x86 compatible processor) coupled to memory that stores instructions to be executed to perform the steps described above. In other embodiments, a field programmable gate array (FPGA) is programmed to perform the operations described above. In still other embodiments, a dedicated purpose integrated circuit is designed to perform the above-described operations.

To provide a more concrete example, suppose that a set of six pulses are transmitted 40000 time bins apart from each other and a set of six pulses are detected some time later. The full vector data representing the transmitted pulses would include the strengths of the six initial pulses, zero values between the pulses, and a series of zeroes from just after the last pulse until the time of the last possible return. Similarly, the full data of the received signal would begin at time 0 and extend until the end of the time window in which reflections of the pulses would be expected.

The full vector data is processed in operations 302 and 304. The non-zero values are identified based on their associated time stamps (e.g., time of transmission or time of detection), so that only non-zero values are stored, as shown in Table 1 below.

TABLE 1

| Event No. | Tx Time Stamp | Detect Time Stamp |
|---|---|---|
| 1 | 0 | 1333336 |
| 2 | 40000 | 1373336 |
| 3 | 80000 | 1413336 |
| 4 | 120000 | 1453336 |
| 5 | 160000 | 1493336 |
| 6 | 200000 | 1533336 |

The six transmit timestamps ($A_i$) are shaped into an array with six repeated rows, as shown below in Table 2:

TABLE 2

| 0 | 40000 | 80000 | 120000 | 160000 | 200000 |
|---|---|---|---|---|---|
| 0 | 40000 | 80000 | 120000 | 160000 | 200000 |
| 0 | 40000 | 80000 | 120000 | 160000 | 200000 |
| 0 | 40000 | 80000 | 120000 | 160000 | 200000 |
| 0 | 40000 | 80000 | 120000 | 160000 | 200000 |
| 0 | 40000 | 80000 | 120000 | 160000 | 200000 |

Similarly, the six timestamps ($B_j$) of detected signals are shaped into an array with six repeated columns, as shown in Table 3:

TABLE 3

| 1333336 | 1333336 | 1333336 | 1333336 | 1333336 | 1333336 |
|---|---|---|---|---|---|
| 1373336 | 1373336 | 1373336 | 1373336 | 1373336 | 1373336 |

TABLE 3-continued

| 1413336 | 1413336 | 1413336 | 1413336 | 1413336 | 1413336 |
|---|---|---|---|---|---|
| 1453336 | 1453336 | 1453336 | 1453336 | 1453336 | 1453336 |
| 1493336 | 1493336 | 1493336 | 1493336 | 1493336 | 1493336 |
| 1533336 | 1533336 | 1533336 | 1533336 | 1533336 | 1533336 |

In operation 306, each of the entries in Table 2 (values $A_i$) is subtracted from its corresponding entry in Table 3 (values $B_j$) to generate a difference table d of thirty six (6 timestamps $A_i \times 6$ timestamps $B_j$) pairwise differences $d_{ij}$, as shown below in Table 4:

TABLE 4

| 1333336 | 1293336 | 1253336 | 1213336 | 1173336 | 1133336 |
|---|---|---|---|---|---|
| 1373336 | 1333336 | 1293336 | 1253336 | 1213336 | 1173336 |
| 1413336 | 1373336 | 1333336 | 1293336 | 1253336 | 1213336 |
| 1453336 | 1413336 | 1373336 | 1333336 | 1293336 | 1253336 |
| 1493336 | 1453336 | 1413336 | 1373336 | 1333336 | 1293336 |
| 1533336 | 1493336 | 1453336 | 1413336 | 1373336 | 1333336 |

Pairwise differences having the same value are summed or "binned" together in operation 308 to generate a histogram (see Table 5, below). In this example, the weights at each location are taken to be 1, so that the cross-correlation of the sequences is the number of difference pairs in each bin.

TABLE 5

| Time bin | Number of difference pairs |
|---|---|
| 1133336 | 1 |
| 1173336 | 2 |
| 1213336 | 3 |
| 1253336 | 4 |
| 1293336 | 5 |
| 1333336 | 6 |
| 1373336 | 5 |
| 1413336 | 4 |
| 1453336 | 3 |
| 1493336 | 2 |
| 1533336 | 1 |

For example, in the case of a laser range finder, the bin with the largest value (in this example, 1333336, which appears as six pairwise differences in Table 4) corresponds to the delay between the transmission and the detection of the pulse sequence.

Figure 4:
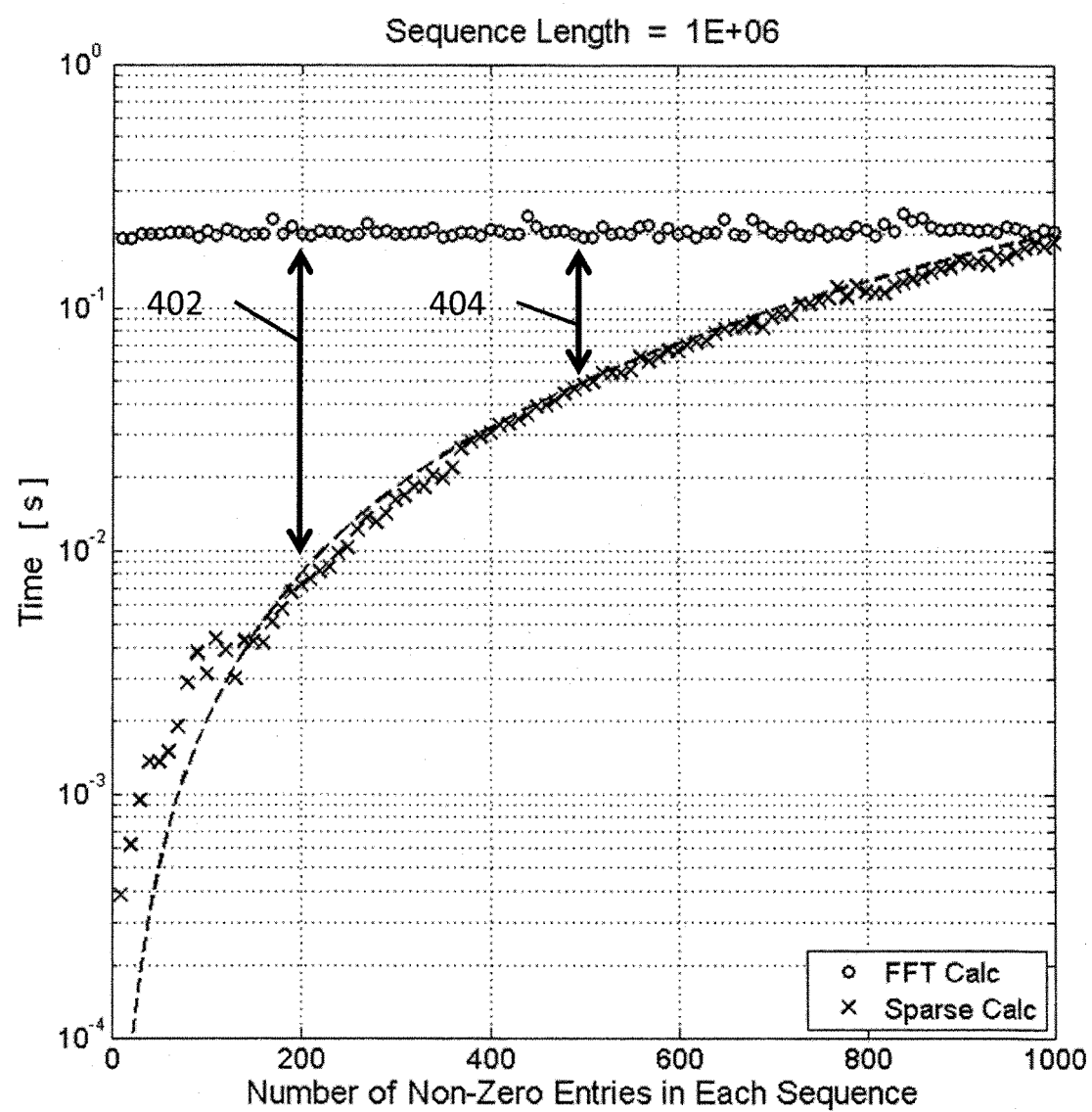
FIG. 4 is a graph comparing the compute time for computing a cross-correlation of two sparse signals using an FFT method and a method according to one embodiment of the present invention.

FIG. 4 is a graph comparing the time required for computing a cross-correlation of two binary sparse signals using both an FFT method and a method according to one embodiment of the present invention. In all trials shown in FIG. 4, the input sequences a and b were each one million entries long (in other words, $N_a=N_b=1E+06$), the horizontal axis represents the number of non-zero entries (n) in each sequence (the indices of nonzero values were chosen randomly for each sequence), and the vertical axis is a log-scale graph of the computation time.

As discussed above, the FFT method for computing cross correlations uses the full input sequences of length N in performing the calculations and its computational complexity is on the order of $N \log_2 N$. Therefore, the computation time is substantially independent of the number of non-zero entries (n), as shown by the substantially horizontal line of the "FFT Calc" data points in FIG. 4 that all fall between 0.1 and 0.3 seconds across the range of n from 1 to 1000.

On the other hand, embodiments of the present invention operate with computation complexity on the order of n² (and independent of N) because only the n non-zero entries of the sequences are considered. Therefore, in cases where n is much smaller than N (when dealing with sparse sequences), embodiments of the present invention can provide significant speed up over the FFT method. For example, when computing the cross-correlation of two sequences of length one million and having two hundred non-zero entries each, there is an approximately 30× speed up over the FFT method, as indicated by arrows 402. As another example, when there are five hundred non-zero entries in each sequence of one million entries, embodiments of the present invention provide an approximately 5× speed up over the FFT method.

The degree of speedup will depend on the implementation of the method and the sparsity of the supplied input data. Nevertheless, embodiments of the present invention provide an advantage over the FFT method when the input sequences are sufficiently sparse.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims.

For example, although the signal processing system 100 in the example above is described in the context of a transmitter/receiver system 10 for use in a laser radar range finder, embodiments of the present invention are not limited thereto and may be applied in other contexts involving the computation of the cross-correlation of sparse signals.

In some embodiments of the present invention approximate methods can be used to increase the sparsity of the data. For example, in some embodiments of the present invention, values in the full vector that are below a threshold level can be converted to zeroes or left out of the sparse index vector in order to increase sparsity.

Embodiments of the present invention can be applied in a variety of contexts in which the input signals are sparse such as constellation matching for feature-based pose estimation or registration in imagery.

What is claimed is:

1. A method for signal processing of radar signals to determine target range information, using a cross-correlation between a first signal pulse sequence and a second signal pulse sequence, the method comprising:
    transmitting the first signal pulse sequence towards a target, by a transmitter;
    receiving the second signal pulse sequence reflected from the target, by a receiver;
    determining the cross-correlation between the first signal pulse sequence and the second signal pulse sequence, wherein determining the cross-correlation comprises:
        generating a first index vector based on the first signal pulse sequence, the first index vector comprising a plurality of first elements, the first index vector excluding indices of the zero valued elements of the first signal pulse sequence;
        generating a second index vector based on the second signal pulse sequence, the second index vector comprising a plurality of second elements, the second index vector excluding indices of the zero valued elements of the second signal pulse sequence;
        computing, on a processor, a plurality of pairwise differences between each of the first elements of the first index vector and each of the second elements of the second index vector; and
        time binning, on the processor, the plurality of pairwise differences to generate the cross-correlation of the first signal pulse sequence and the second signal pulse sequence; and
    generating target range information from the cross-correlation of the first signal pulse sequence and the second signal pulse sequence.

2. The method of claim 1, further comprising identifying a largest valued bin from among a plurality of time bins produced by the time binning the plurality of pairwise differences.

3. The method of claim 1, wherein the first signal pulse sequence and the second signal pulse sequence are binary valued.

4. The method of claim 1, wherein the first signal pulse sequence and the second signal pulse sequence are real valued or complex valued.

5. The method of claim 4, wherein the first signal pulse sequence comprises a plurality of first weights and wherein the second signal pulse sequence comprises a plurality of second weights.

6. The method of claim 5, wherein time binning of the pairwise differences into a plurality of time bins to generate the cross-correlation of the first signal pulse sequence and the second signal pulse sequence comprises, for each time bin:
    multiplying the weights of the values of each pair of elements of the time bin to generate a plurality of products; and
    summing the plurality of products of the time bin.

7. The method of claim 1,
    wherein all of the elements of the first index vector are non-zero, and
    wherein all of the elements of the second index vector are non-zero.

8. The method of claim 1, further comprising converting elements of the first signal pulse sequence below a threshold level to a value of zero before generating the first index vector based on the first signal pulse sequence.

9. A system for signal processing of radar signals to determine target range information, using a cross-correlation between a first signal pulse sequence and a second signal pulse sequence, the system comprising:
    a transmitter for transmitting the first signal pulse sequence towards a target;
    a receiver for receiving the second signal pulse sequence reflected from the target;
    a memory configured to store the first signal pulse sequence and the second signal pulse sequence; and
    a processor configured to determine the cross-correlation between the first signal pulse sequence and the second signal pulse sequence, wherein determining the cross-correlation comprises:
        generate a first index vector based on the first signal pulse sequence, the first index vector comprising a plurality of first elements, the first index vector excluding indices of the zero valued elements of the first signal pulse sequence;
        generate a second index vector based on the second signal pulse sequence, the second index vector comprising a plurality of second elements, the second index vector excluding indices of the zero valued elements of the second signal pulse sequence;

compute a plurality of pairwise differences between each of the first elements of the first index vector and each of the second elements of the second index vector;

time bin the plurality of pairwise differences to generate the cross-correlation of the first signal pulse sequence and the second signal pulse sequence; and generate target range information from the cross-correlation of the first signal pulse sequence and the second signal pulse sequence.

10. The system of claim 9, wherein the processor is further configured to identify a largest valued time bin from among a plurality of time bins of pairwise differences.

11. The system of claim 9, wherein the first signal pulse sequence and the second signal pulse sequence are binary valued.

12. The system of claim 9, wherein the first signal pulse sequence and the second signal pulse sequence are real valued or complex valued.

13. The system of claim 9, wherein the first signal pulse sequence comprises a plurality of first weights and wherein the second signal pulse sequence comprises a plurality of second weights.

14. The system of claim 13, wherein the processor is further configured to time bin the plurality of differences into a plurality of time bins to generate the cross-correlation of the first signal pulse sequence and the second signal pulse sequence by, for each time bin:

multiplying the weights of the elements of each pair of elements of the time bin to generate a plurality of products; and summing the plurality of products of the time bin.

15. The system of claim 9, wherein all of the elements of the first index vector are non-zero, and wherein all of the elements of the second index vector are non-zero.

16. The system of claim 9, wherein the processor is further configured to convert elements of the first signal pulse sequence below a threshold level to a value of zero before generating the first index vector based on the first signal pulse sequence.

* * * * *